United States Patent
Altenhofen et al.

(10) Patent No.: US 7,584,163 B2
(45) Date of Patent: Sep. 1, 2009

(54) METHOD AND SYSTEM FOR EXPRESSION EVALUATION

(75) Inventors: Michael Altenhofen, Karlsruhe (DE); Thomas Hettel, Brisbane (AU)

(73) Assignee: SAP AG, Walldorf (DE)

( * ) Notice: Subject to any disclaimer, the term of this patent is extended or adjusted under 35 U.S.C. 154(b) by 270 days.

(21) Appl. No.: 11/521,266

(22) Filed: Sep. 14, 2006

(65) Prior Publication Data

US 2008/0126027 A1 May 29, 2008

(51) Int. Cl.
*G06F 17/00* (2006.01)
*G06N 5/02* (2006.01)

(52) U.S. Cl. .................................................. 706/47
(58) Field of Classification Search ................ None
See application file for complete search history.

(56) References Cited

U.S. PATENT DOCUMENTS

| | | | |
|---|---|---|---|
| 5,605,290 A * | 2/1997 | Brenholdt | 241/21 |
| 5,680,602 A | 10/1997 | Bloem et al. | |
| 6,694,290 B1 * | 2/2004 | Apfelbaum et al. | 703/22 |
| 6,719,648 B1 * | 4/2004 | Smith | 473/409 |
| 6,847,970 B2 * | 1/2005 | Keller et al. | 707/100 |
| 7,096,459 B2 * | 8/2006 | Keller et al. | 717/124 |
| 7,137,100 B2 * | 11/2006 | Iborra et al. | 717/106 |
| 7,240,325 B2 * | 7/2007 | Keller | 717/104 |
| 7,254,577 B2 * | 8/2007 | Gupta et al. | 707/6 |
| 7,281,170 B2 * | 10/2007 | Taylor et al. | 714/48 |
| 7,334,222 B2 * | 2/2008 | Keller | 717/135 |
| 7,343,524 B2 * | 3/2008 | Klotz et al. | 714/39 |
| 7,352,706 B2 * | 4/2008 | Klotz et al. | 370/254 |
| 7,441,154 B2 * | 10/2008 | Klotz et al. | 714/39 |
| 7,505,872 B2 * | 3/2009 | Keller et al. | 702/186 |

OTHER PUBLICATIONS

Bug Mining Model Based on Event-Component Similarity to Discover Similar and Duplicate GUI Bugs Nagwani, Naresh Kumar; Singh, Pradeep; Advance Computing Conference, 2009. IACC 2009, IEEE International Mar. 6-7, 2009 pp. 1388-1392 Digital Object Identifier 10.1109/IADCC.2009.4809219.*

An approach for the effective utilization of GP-GPUS in parallel combined simulation Bauer, D.W.; McMahon, M.; Page, E.H.; Simulation Conference, 2008. WSC 2008. Winter Dec. 7-10, 2008 pp. 695-702 Digital Object Identifier 10.1109/WSC.2008.4736131.*

Quantifying Temporal and Spatial Correlation of Failure Events for Proactive Management Song Fu; Cheng-Zhong Xu; Reliable Distributed System, 2007. SRDS 2007. 26th IEEE International Symposium on Oct. 10-12, 2007 pp. 175-184 Digital Object Identifier 10.1109/SRDS.2007.18.*

(Continued)

*Primary Examiner*—Michael B Holmes
(74) *Attorney, Agent, or Firm*—Schwegman, Lundberg & Woessner, P.A.

(57) ABSTRACT

A method to analyze impact of changes to a model includes accessing a proposed change to a model. An expression that is relevant to the proposed change is accessed. An instances set associated the expression is obtained. The instance set is evaluated to determine an impact of the proposed change to the model. An application utilizes the expression of a model. An impact analyzer assesses impact of a change to the model by evaluating at least one of the one or more expressions and returning an evaluation set for use by the application.

25 Claims, 14 Drawing Sheets

OTHER PUBLICATIONS

Dependability Analysis of Information Systems with Hierarchical Reconfiguration of Services Caban, D.; Zamojski, W.; Emerging Security Information, Systems and Technologies, 2008. SECURWARE '08. Second International Conference on Aug. 25-31, 2008 pp. 350-355 Digital Object Identifier 10.1109/SECURWARE. 2008.32.*

Cabot, et al., "Computing the relevant instances that may violate an OCL constraint", *CAISE 2005, LNCS 3520*, (2005),48-62.

Cabot, et al., "Determining the structural events that may violate an integrity constraint", *UML, LNCS 3273*, (2004),320-334.

SAP AG, "OCL Impact Analysis", *footer: "SAP AG 2005, OCR Impact Analysis/Michael Altenhofen/4"*, SAP development architect Altonhofen's PPT file printed to PDF,(2005),17 page.

"European Application Serial No. 07000530.1 , Search Report mailed Aug. 17, 2007", 11 pgs.

"Fakultatsbibliothek Informatik Neuerwerbungen Apr. 2006", *Universitat Karlsruhe*, XP002445493,(Jun. 2, 2006).

Altenhofen, H. K., "OCL support in an industrial environment", *In: OCL for (Meta-) Model in Multiple Application Domains, Technical Report, Technische Universitat Dresden*, XP002445485,(Sep. 2006), 126-138.

Egyed, Alexander , "Instant consistency checking for the UML", *Proceeding of the 28th international conference on Software engineering*, XP002444730,(2006),381-390.

Hettel, Thomas , "Impact analysis of OCL expressions", *Unversität Karlsruhe (TH) Institut AIFB und SAP Research (CEC) Karlsruhe*, XP009087735,(Apr. 2006),124 pgs.

Johann, S. , et al., "Instant and incremental transformation of models", *Published in the Proceedings of the 19th IEEE International Conference on Automated Software, Engineering (ASE) Linz, Austria*, XP010730467,(Sep. 20, 2004),362-365.

* cited by examiner

METHOD AND SYSTEM FOR EXPRESSION EVALUATION

TECHNICAL FIELD

The present application relates generally to the technical field of expression evaluation and, in one specific example, to a method and system for evaluating expressions associated with a model.

BACKGROUND

Models of applications may be represented by modeling languages. While modeling languages may be used to describe structural relationships with the models, the modeling languages typically do not provide a mechanism for describing expressions associated with the model. A formal expression language may be used along with the modeling language to describe the expressions associated with the model.

When changing a model associated with a number of expressions, each of the number of expressions may be reevaluated to ensure that the resulting model is still valid. The reevaluation of the number of expressions associated with a model of substantial size may be processing intensive on a computing system, even though a subset of the number of expressions may only be effected by the change.

BRIEF DESCRIPTION OF THE DRAWINGS

Some embodiments are illustrated by way of example and not limitation in the figures of the accompanying drawings in which.

DETAILED DESCRIPTION

Example methods and systems for evaluating expressions associated with a model are described. In the following description, for purposes of explanation, numerous specific details are set forth in order to provide a thorough understanding of example embodiments. It will be evident, however, to one skilled in the art that the present invention may be practiced without these specific details.

A model may have expressions to further define the model. Modifications to the model may necessitate reevaluating at least some of the expressions for certain instances of the model. When a proposed change to a model with one or more expressions may be accessed, one or more instances sets associated with each of the one or more expressions may be obtained. Each instance set may include a starting point and a reverse navigation path.

An impact of the proposed change to the model may be assessed by evaluating relevant expressions, for which the instance sets are evaluated using the starting points and the reverse navigation paths.

Figure 1:
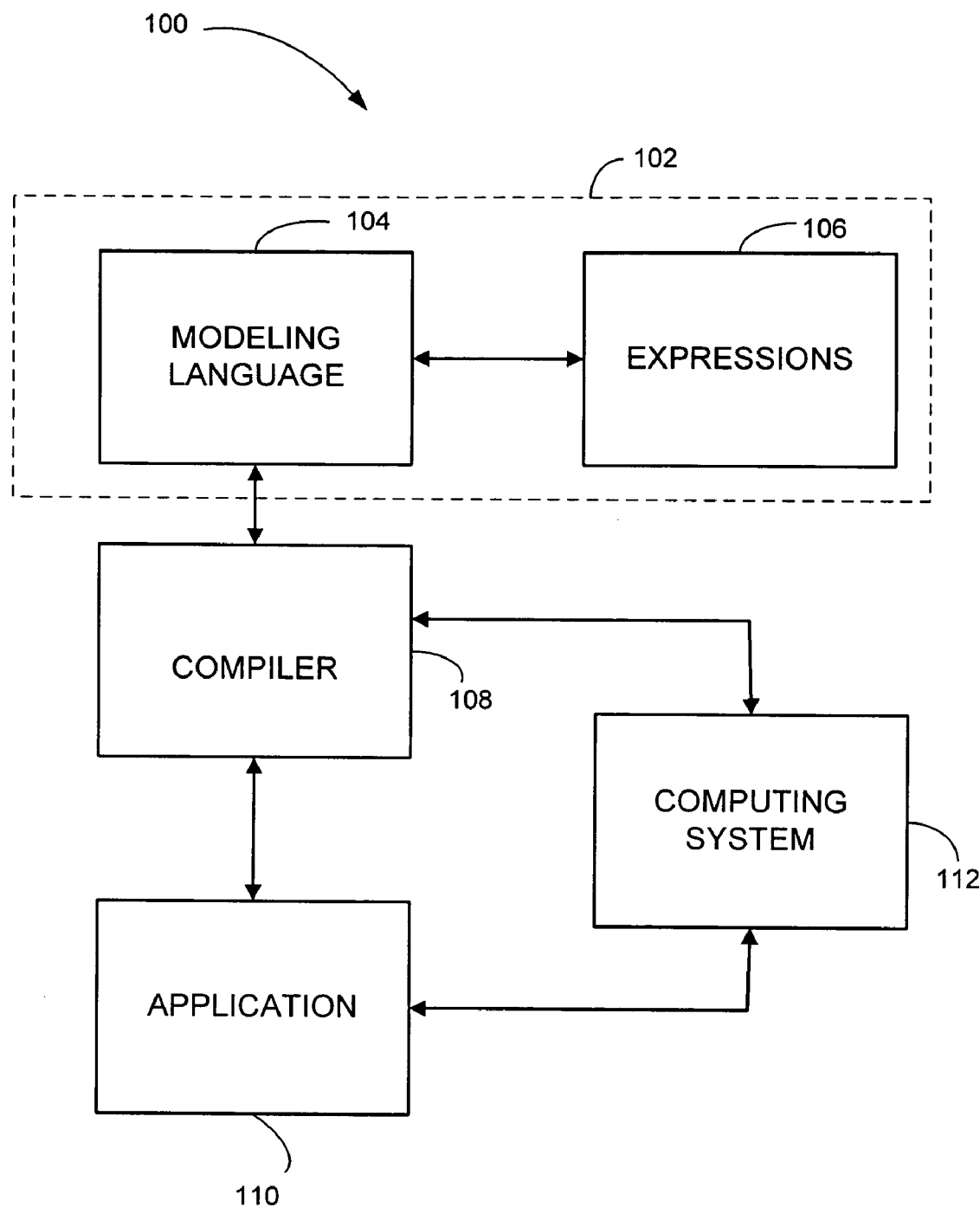
FIG. 1 is a block diagram of a system for accessing a model according to an example embodiment.

Referring to FIG. 1, a system 100 for accessing a model 102 according to an example embodiment is illustrated. For example, the model 102 may represent a relationship, a real word domain such as an organization, user interface (UI) elements of an application, system components of a software architecture, the elements contained in a business object implementing an enterprise service, and the like. In an example embodiment, the model 102 may be a model or a metamodel.

The model 102 may be represented by a modeling language 104, and one or more expressions 106 may further define the model 102. The modeling language 104 may describe the model 102 in a program neutral way. In an example embodiment, the modeling language 104 used to represent the model 102 may be uniform modeling language (UML), a subset of UML or the meta object facility (MOF). For example, the modeling language 104 may be used to diagram structural relationships by use of a class diagram. In an example embodiment, the language used to represent the one or more expressions 106 may be object constraint language (OCL).

The expressions 106 may be in a formal language used to describe expressions on the model 102, such as one or more constraints for the model 102 and model-to-model transformation rules. In an example embodiment, the expressions 106 of the model 102 may be represented in a separate expression language to the modeling language 104. By way of example, an expression 106 on a model 102 may be to provide all employees that work under a particular boss, such that evaluation of the expression 106 may return a set of the employees that work for the particular boss.

In an example embodiment, a change to the model 102 may trigger a need or desire to reevaluate a subset of the one or more constraints such that the model 102 may continue to be valid after the change has been applied to the model 102. For example, a formal language used to describe the constraints may be object constraint language (OCL) expressions. In an example embodiment, the constraints may include invariants, pre-conditions, post-conditions and operation definitions.

By way of example, if the model 102 is of a company, a constraint on the model 102 may be that an employee of a department cannot earn more money than a boss of the department or that for a particular job title the employee cannot earn more than a certain amount of money per year.

In an example embodiment, dependency of a target model 102 from a source model 102 may be described by the expressions 106, such that regeneration of pieces of the target model 102 may occur from a change in the source model 102. The pieces may be identified by the expressions 106, such that monitoring model change events that affect those expressions 106 may determine pieces of the target model 102 to regenerate. For example, evaluation of the expressions 106 may provide a value of an attribute that may be assigned to a model element of the target model 102, and generate a list of elements of the source model 102 to consider in a loop used to generate portions of the target model 102.

A compiler 108 may compile the model 102 into programming language code that may be used by the application 110. By way of example, the model 102 may be a model 102 for a company including departments and employees. The compiler 108 may generate the programming language objects from the model 102. The programming language objects may be in the Java programming language, such that generated classes may enable access to a department or an employee, creation of a department, modification of the relationship between the department and an employee in the model 102.

In an example embodiment, the compiler 108 may compile code of the model 102 before use by an application 110. In an example embodiment, the compiler 108 may compile the code at run-time.

The application 110 may use the programming language objects that are generated by the compiler 108 to work with the model 102. In an example embodiment, the application 110 may be an editor, a simulation tool, a graphical user interface (GUI), and the like. The application 110 and the compiler 108 may operate on a computing system 112. An example embodiment of the computing system 112 is described in greater detail below.

In an example embodiment, the model 102 may be an underlying structure that enables alteration of a way that the application 110 functions. For example, elements of a user interface for manipulating the model 102 may be enabled or disabled depending on a query of a state of the model 102.

Figure 2:
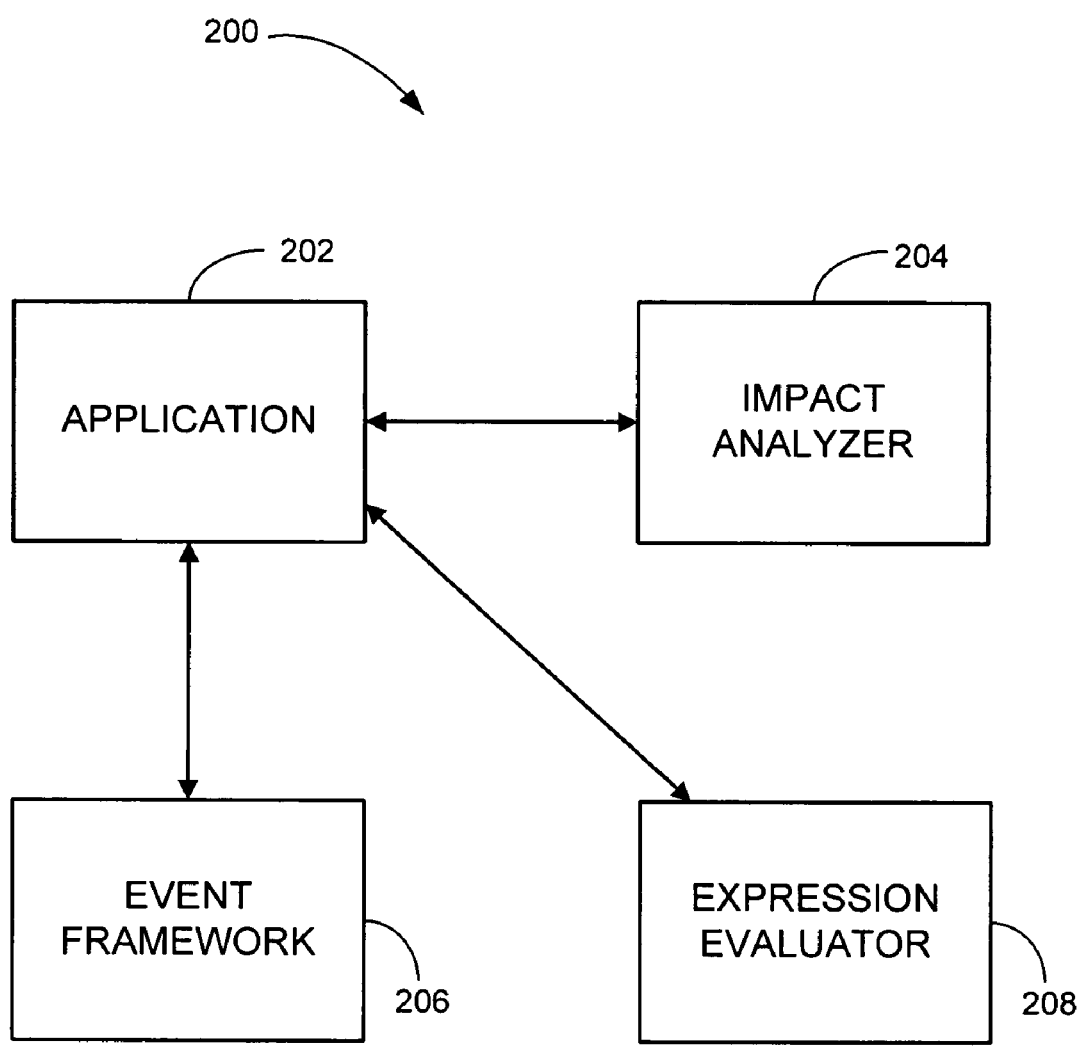
FIG. 2 is a block diagram of an apparatus for model interpretation according to an example embodiment.

Referring to FIG. 2, an apparatus 200 for model interpretation according to an example embodiment is illustrated. The apparatus 200 may include an application 202 in communication with an impact analyzer 204, an event framework 206 and an expression evaluator 208.

In an example embodiment, the application 202 may be a subset of the application 110, such that the application 202 may be a portion of the application 110 that utilizes the expressions 106 of the model 102 (see FIG. 1). For example, the application 202 may be a constraint checker or a model transformation engine.

Changes to the model 102 are sent to the application 202 via an event framework 206. By subscribing to the event framework 206, whenever a change occurs to the model 102, for example by introducing a new employee or changing a boss of a department, the event framework 206 may notify the application 202 that the model 102 has changed. In an example embodiment, a filter may be used to specify selected notifications to be received by the application 202 based on an event kind and an event type.

When the application 202 receives notification from the event framework 206 that a change has occurred to the model 102, the application 202 knows that expressions 106 attached to the model 102 may need to be re-evaluated by the expression evaluator 208.

In an example embodiment, without use of the impact analyzer 204, the application 202 may re-evaluate all the expressions 106 on the model 102, whenever anything changes in the model 102. For example, if a model 102 has several hundred elements and several dozens of expressions 106 on the model 102, re-evaluation may involve re-evaluating thousands of the expressions 106 even though most values associated with the expressions 106 have not changed.

The application 202 may provide the impact analyzer 204 with the expressions 106 that are on the model 102. The impact analyzer 204 may then assess an impact of changes to the model 102 by evaluating the expressions 106 and return to the application 202 events that the application 202 needs to subscribe to in the event framework 206. By subscribing the application 202 to the event framework 206, the event framework 206 may indicate to the application 202 a subset of changes that may have an impact on the expressions 106 instead of all of the changes to the model 102.

Once the application 202 has subscribed to the event framework 206 and receives a notification from the event framework 206 regarding a change to the model 102, the application 202 may provide the impact analyzer 204 with the event and receive the expression 106 to be re-evaluated based on the change in a form of an evaluation set. By way of example, if a wage of an employee has changed, the event framework 206 may notify the application 202 to re-evaluate the expression 106 that checks an employee's wage against the wage of his boss.

The application 202 may provide the evaluation set to the expression evaluator 208 for evaluation. An example embodiment of the evaluation set and a method for evaluating the evaluation set is described in greater detail below.

By way of an example, the model 102 may describe a company with all departments and employees, the expressions 106 on the model 102 may define business rules of the company, the application 110 may be a company software management program, and the application 202 may be a constraint checker. Changes to the model 102 may include hiring employees, firing employees, providing bonuses to the employees, and the like. For these changes to the model, the application 202 may use the impact analyzer 204 to determine the changes in the model 102 are relevant to the business rules of the company. The changes may be provided to the impact analyzer 204 which then returns an evaluation set. The evaluation set may be provided to the expression evaluator 208 to determine whether the changes evaluate to true, thereby indicating that the business rules are still being met after the change. If the business rules are not met after the change, a component of the system 100 may be notified of a violation of the business rules, the application 202 could roll back the recently made changes, an e-mail may be sent to provide a notification of the violation, a transaction within the model 104 may be aborted, and the like.

The results of the evaluation by the expression evaluator 208 may be provided to the application 202, such as a set of attribute values or a collection of model elements. For example, if the expressions 106 are constraints, the results of the valuation may be a set of two-fold values. The application 202 in the form of a constraint checker may expect that all the values in the set of two-fold values are true.

By way of example, a source model 102 may be a database, a target model 102 may be a UML diagram, and the expressions 106 may be a set of transformation rules that indicate which piece of the database maps onto a piece of the UML diagram. The database may include a model for an employee with an attribute salary, such the employee may have a box that has a title string "employee" with one field with a name "salary". If the name of the attribute is changed from "salary to "wage", the model to model transformation would know to change a particular box in the UML diagram. The expression 106 may be used to access the name string in the source model 102 and pass the name string into the target model 102.

By way of example, a source model 102 may be a company model and a target model 102 is an organization chart. A first transformation rule may indicate to start an organization chart first with a boss and then have an expression 106 that obtains the boss from a department. The expression evaluator 208 may then return the employee that is the boss of that department, which information may be used to draw a first box. A second transformation rule may indicate to next draw all the employees that work for the boss in the department in the organization chart such that a next expression 106 would provide all the employees that work for the boss. The expression evaluator 208 may then return a collection of employees as elements. The application 202 may then iterate over the sets of employees and draw boxes in the organization chart while inserting names in the organization chart as appropriate.

Figure 3:
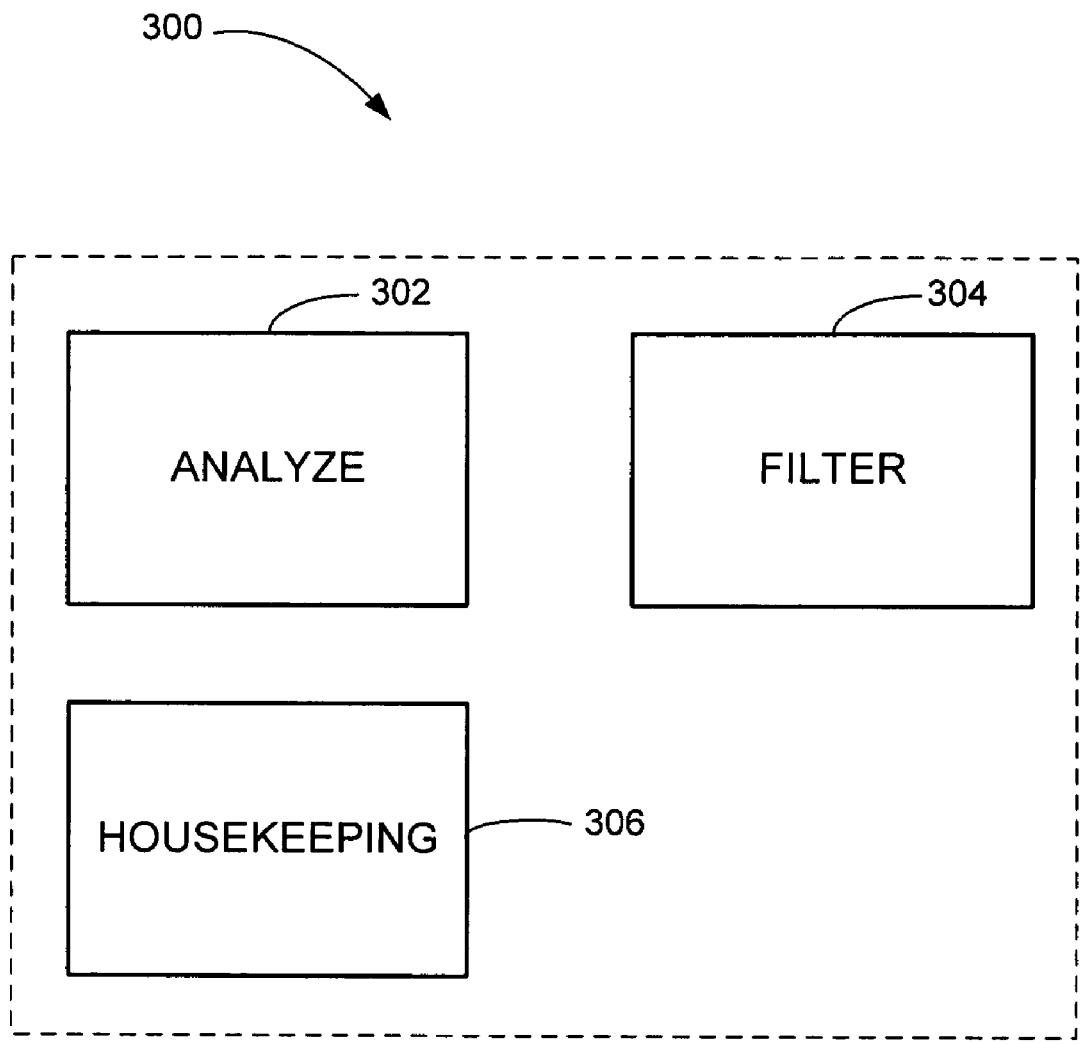
FIG. 3 is a block diagram of an apparatus to assess impact according to an example embodiment.

Referring to FIG. 3, an apparatus 300 to assess impact is illustrated. The impact analyzer 204 (see FIG. 2) may include the apparatus 300. The apparatus 300 may include an analyze component 302, a filter component 304 and a housekeeping component 306. In an example embodiment, the apparatus 300 may act as an application programming interface (API) for the impact analyzer 204.

The analyze component 302 may receive a number of expressions 106 from the application 202 and may return a subscription filter to the application 202 that may be used to subscribe to the event framework 206 (see FIG. 2). For example, the analyze component 302 may analyze the events to which the application 202 has subscribed in the event framework 206 to be informed regarding changes to the model 102 of interest given the provided expressions 106 to the model 102 (see FIG. 1).

Once the application 202 has subscribed to the event framework 206, when an event is sent to the application 202, the filter component 304 may determine which of the expressions 106 of the model 102 should be evaluated based on the event that occurred.

The housekeeping component 306 may provide housekeeping for the analyze component 302 and the filter component 304. For example, the housekeeping component 306 may build an event cache during a first phase to enable a fast lookup during a second phase.

In an example embodiment, the first phase may be when the analyze component 302 analyzes the events to which the application 202 has subscribed in the event framework 206.

In an example embodiment, the second phase may be when the application 202 provides the events from the event framework 206 to the impact analyzer 204. The apparatus 300 may then use the housekeeping component 306 to access the expressions 106 for evaluation based on the notification received from the event framework 206 and provide the expressions 106 back to the application 202 that are relevant for the events.

In an example embodiment, the information regarding the changes to the model 102 that will affect the expressions 106 may be associated with the housekeeping component 306 as internal events. For example, use of the internal events may be limited to inside the impact analyzer 204. The internal events may be transformed by the housekeeping component 306 into model change event filters that the application 202 may use to subscribe to through the event framework 206.

Figure 4:
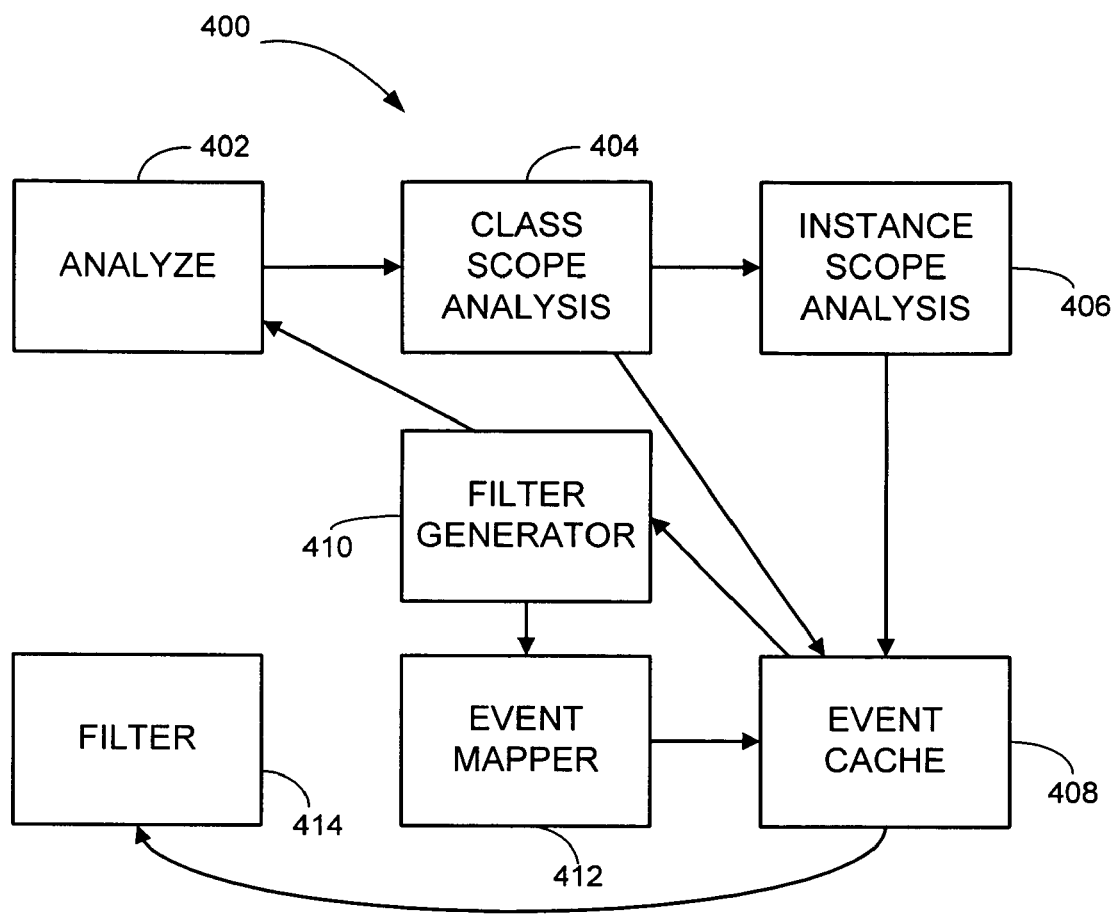
FIG. 4 is a block diagram of a system for assessing impact according to an example embodiment.

Referring to FIG. 4, a system 400 to assess impact is illustrated. For example, the system 400 may analyze impact by analyzing expressions 106 (see FIG. 1) and returning an event subscription filter and the expressions 106 to be evaluated in response to an event.

The system 400 includes an analyze function 402 that calls a class scope analysis 404 and an instance scope analysis 406. In an example embodiment, the analyze component 302 (see FIG. 3) may include the analyze function 402, the class scope analysis 404, and the instance scope analysis 406.

The class scope analysis 404 may parse the expressions 106 received from the analyze function 402 and provide an output that identifies the events that are relevant to the expressions 106. In an example embodiment, all instances of the context for each event may be taken into account by the class scope analysis 404.

In an example embodiment, the output of the class scope analysis 404 may be an attributed abstract syntax tree (AST). The internal events may be attached to each node of the attributed AST based on relevancy. For example, tags may be included on nodes of the AST to indicate portions of the expression 106 that are irrelevant for certain event types.

In an example embodiment, the output of the class scope analysis 404 may be a key value path where the key is the event type plus the expression 106 and the value is the expressions 106 needed to compute the model event for which evaluation of the expression 106 is needed. In an example embodiment, the class scope analysis 404 may store the key value path in an event cache 408.

The instance scope analysis 406 may access the output from the class scope analysis 404 and associate navigation paths with the output such as reverse navigation paths. For example, the reverse navigation paths may lead from instances affected by the events to context instances of an affected expression 106. The output from the instance scope analysis 406 may be stored in an event cache 408.

In an example embodiment, the instance scope analysis 406 may traverse the AST to determine for which instances the expression 106 may need to be evaluated. The instance scope analysis 406 may traverse the AST and override entries in the event cache 408 by repairing the expressions 106 that have been stored by the class scope analysis 404.

In an example embodiment, after the class scope analysis 404 is applied, the event cache 408 may contain all the expressions 106 that are all instances. The instance scope analysis 406 may traverses the AST again, and replace the expressions 106 by more appropriate and finer grained expressions 106 that indicate the instances in which the expressions 106 are to be considered.

The event cache 408 may act as a data structure for the impact analyzer 204. In an example embodiment, the output from the class scope analysis 404 may be stored in the event cache 408. In an example embodiment, the instance scope analysis 406 may revise the output stored in the event cache 408 to include the reverse navigation path.

A filter generator 410 may create filter expressions (e.g., a subscription filter), such as for events matching the model change events relevant to the expressions 106, from information stored in the event cache 408 by the instance scope analysis 406.

For example, after the instance scope analysis 406, the event cache 408 has information identifying which events are relevant for the expressions 106. The filter generator 410 may use the information stored in the event cache 408 to identify to which events the application 202 needs to subscribe by passing the information back to the application 202 through the analyze function 402.

In an example embodiment, the event cache 408 may store information about event types. For example, the information stored may include the expressions 106 that need to be evaluated when a value of an attribute wage changes within a type employee. A particular instance of the expression 106 may be used as an input for a filter, such that the filter may indicate that the wage for an employee has risen to a certain amount.

An event mapper 412 may provide a mapping between the model change events and the internal events. For example, notifications that contain model change events may be mapped by the event mapper 412 to internal events that may then be used to access information in the event cache 408.

During execution of a filter function 414, the events may be accessed in the event cache 408 and returned information may be converted into an evaluation set. For example, the evaluation set may be provided to the application 202 as a result of the filter function 414 (see FIG. 2).

In an example embodiment, the event mapper 412 may relate an event instance to an event type. The event type may then be passed onto the event cache 408, which may then perform a look-up within the event cache 408 and return an evaluation set and an evaluation unit to the filter function 414.

Figure 5:
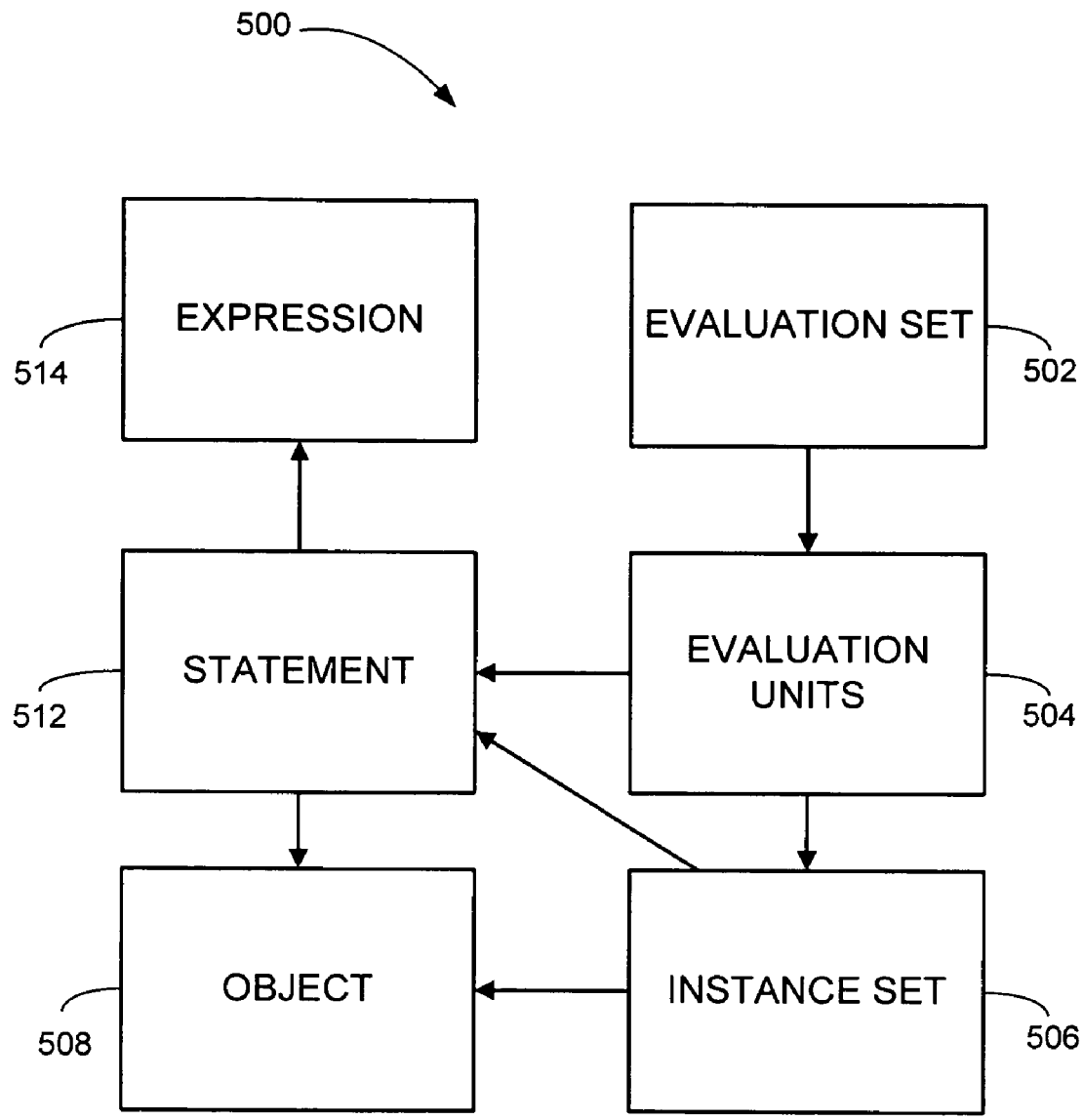
FIG. 5 is a block diagram of a data structure to evaluate an expression according to an example embodiment.

Referring to FIG. 5, a data structure 500 to evaluate an expression is illustrated. For example, the data structure 500 may demonstrate what the application 202 may receive from the impact analyzer 204 as a result of executing the filter function 414 (see FIGS. 2 and 4).

An evaluation set 502 may consist of a number of evaluation units 504, and each of the evaluation units 504 may contain a statement 512 and a number of instance sets 506. For example, the statement 512 may include an expression 514 of what to evaluate and the instance set 506 may include a number of instances in the model 102 for which the statement 512 is to be evaluated.

In an example embodiment, the evaluation set 502 may define a number of evaluation units 504 to consider for a change to the model 102 (see FIG. 1). For example, the evaluation set 502 may be provided to the application 202 as a result of the filter function 414 (see FIGS. 2 and 4).

In an example embodiment, when a model change event is received, the impact analyzer 204 may access information stored for the model change event and use the stored information to return the evaluation set 502 to the application 202.

Each instance set 506 may be a data structure usable by the application 202 that can be passed on to the expression evaluator 208 (see FIG. 2). The expression evaluator 208 may loop over the evaluation set 502 and select each of the evaluation units 504. For each evaluation unit 504, the expression evaluator 208 may examine the navigation paths defined by the expressions 514 and starting points defined by the objects 508 of the instance sets 506. After the instance sets 506 have been computed, the expression evaluator 208 may perform an evaluation by examining the instance sets 506.

For example, a change in the model 102 may have an influence on more than one statement 512 that are attached to the model 102. The change may trigger the re-evaluation of more than one statement 512 which may be the evaluation set 502.

The statement 512 may be a container that contains the expression 514 and an object 508. In an example embodiment, the object 508 may be model elements that are related to the statement 512. In an example embodiment, the expression 514 may be formulated in a same language as the one or more expressions 106.

In an example embodiment, the object 508 may be used to provide context or type information such as the elements in the model 102 that should be considered. In an example embodiment, the object 508 may be used to define a starting point in the instance set 506.

The application 202 may receive a notification from the event framework 206 regarding what has been changed in the model 102. The impact analyzer 204 may identify a number of statements 512 in the form of the evaluation units 504 to be re-evaluated.

In an example embodiment, the instance set 506 may be described by a particular statement 512 that could be used to compute the instance set 506, instead of having the instance set 506 be a set of objects 508 that have already been computed.

In an example embodiment, the expression evaluator 208 (see FIG. 2) may evaluate the evaluation set 502 by accessing the evaluation set 502, looping over the evaluation units 504 that are in the evaluation set 502, selecting the instance sets 506 for each of the evaluation units 504, computing the instance sets 506, and then performing an evaluation of the expression 514 for the evaluation units 504 with the instance sets 506 for the evaluation units 504 in the evaluation sets 502.

In an example embodiment, the evaluation set 502 may include a single evaluation unit. For example, the statement 512 may be to check that a wage of an employee is not higher than the wage of a boss, while the instance set 506 may contain a starting point of a particular employee (e.g., employee A) and the statement 512 that is needed to compute the relevant instances starting with the particular employee would be self. A computation may be made by determining whether the wage of the particular employee is higher than the wage of the boss.

In an example embodiment, if a particular employee (e.g., employee B) is a boss of one or more other employees, and the wage of the particular employee changes, it may not be sufficient to check the wage of the particular employee against the wage of the boss of a department since the particular employee is the boss of the department. Rather, a check would be made as to whether any of the employees of the department has a higher wage than the wage of the particular employee. The object 508 of the instance set 506 may be the particular employee and the expression 514 that would be used to calculate all the instances may be self.employees or self.department.employees. The expression 514 obtained for the expression evaluator 208 would include first obtaining the instances and then evaluating the instances to determine whether the wage of the employees are lower than the wage of the boss.

Figure 6:
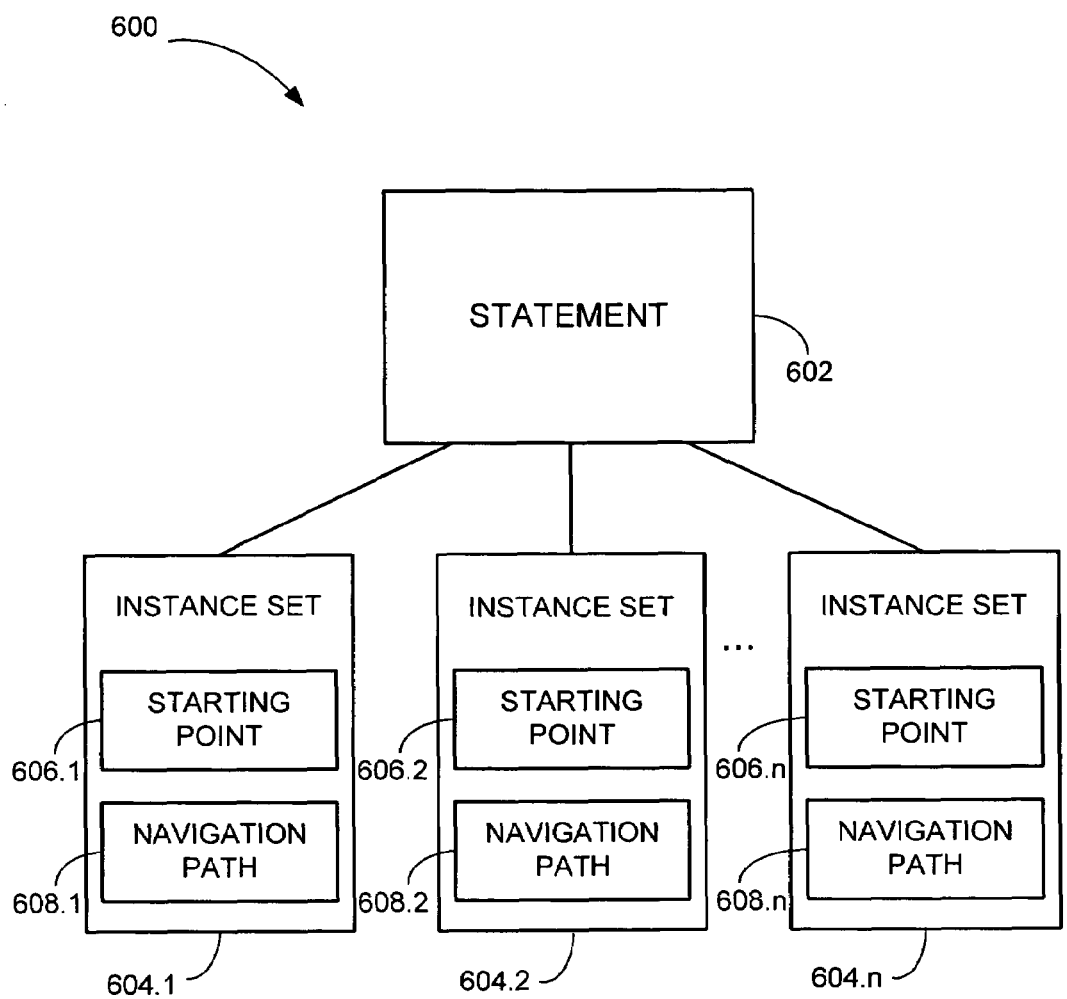
FIG. 6 is a block diagram of a data structure for unit evaluation according to an example embodiment.

Referring to FIG. 6, a data structure 600 for unit evaluation according to an example embodiment is illustrated. In an example embodiment, the evaluation unit 504 (see FIG. 5) may include the data structure 600.

The data structure 600 may include a statement 602 and one or more instances sets 604.1-604.n. The one or more instance sets 604.1-604.n may reflect different instances in which the statement 602 may need to be re-evaluated for a change to the model 102 (see FIG. 1). The statement 512 (see FIG. 5) may be the statement 602. In an example embodiment, the statement 602 may be a first field in the data structure 600 and the instance sets 604.1-604.n may be a second field.

Within the data structure 600, if the statement 602 is to be evaluated, the elements in the model 102 that may need to be considered to perform the evaluation may be a number of the instance sets 604.1-604.n. The instances sets 604.1-604.n may be used instead of actually providing references or pointers to the elements in the model 102.

The instance sets 604.1-604.n may respectively include starting points 606.1-606.n and navigation paths 608.1-608.n. The navigation paths 608.1-608.n may include an expression that can navigate from the starting point 606.1-606.n to something in the model 102, which when traversed may collect the instances in a particular instance set 604. The instance sets 604.1-604.n may identify what should be evaluated for the statement 602. For example, the navigation path may be an expression that provides what to compute back to the filter function 414 (see FIG. 4).

In an example embodiment, the expression evaluator 208 (see FIG. 2) may receive the instance sets 604.1-604.n. For each instance set 604 in an evaluation unit 504 (see FIG. 5), the expression evaluator 208 may start at a starting point 606 and evaluate along a navigation path 608.

In an example embodiment, the instance sets 604.1-604.n may evaluate to a set of context instances that may be considered for the change to the model 102. For example, if a change may affect o particular statement 602, the instance sets 604.1-604.n associated with the statement 602 may be evaluated to determine an impact of the change.

In an example embodiment, the use of the instance sets 604.1-604.n instead of computing the instances may enable further optimization. For example, transforming the expressions 106 as the navigation paths 608 into highly optimized proprietary queries in an internal query language may provide for improved performance.

In an example embodiment, the use of the data structure 600 instead of objects may enable a reduced number of instances for which an expression 106 (see FIG. 1) may need to be evaluated.

In an example embodiment, if the statement 602 is to check a wage of an employee against the wage of his boss and a first instance set 604.1 is a starting point of a particular employee, the navigation path 608.1 may be "self" in a programming language (e.g., do not navigate beyond the starting point 606.1). For a second instance set 604.2, the starting point 606.2 may be a boss of the employee, and the navigation path 608.2 may be to collect all the employees that work in or that directly report to the boss.

In an example embodiment, the navigation path 608.1 may collect all of the instances to evaluate from a particular starting point 606.1. For example, during construction of an instance set 604.1, a starting point 606.1 may be an element that has been changed and the navigation path 608.1 may be an expression that enables collection of all instances to be evaluated for the statement 602.

Figure 7:
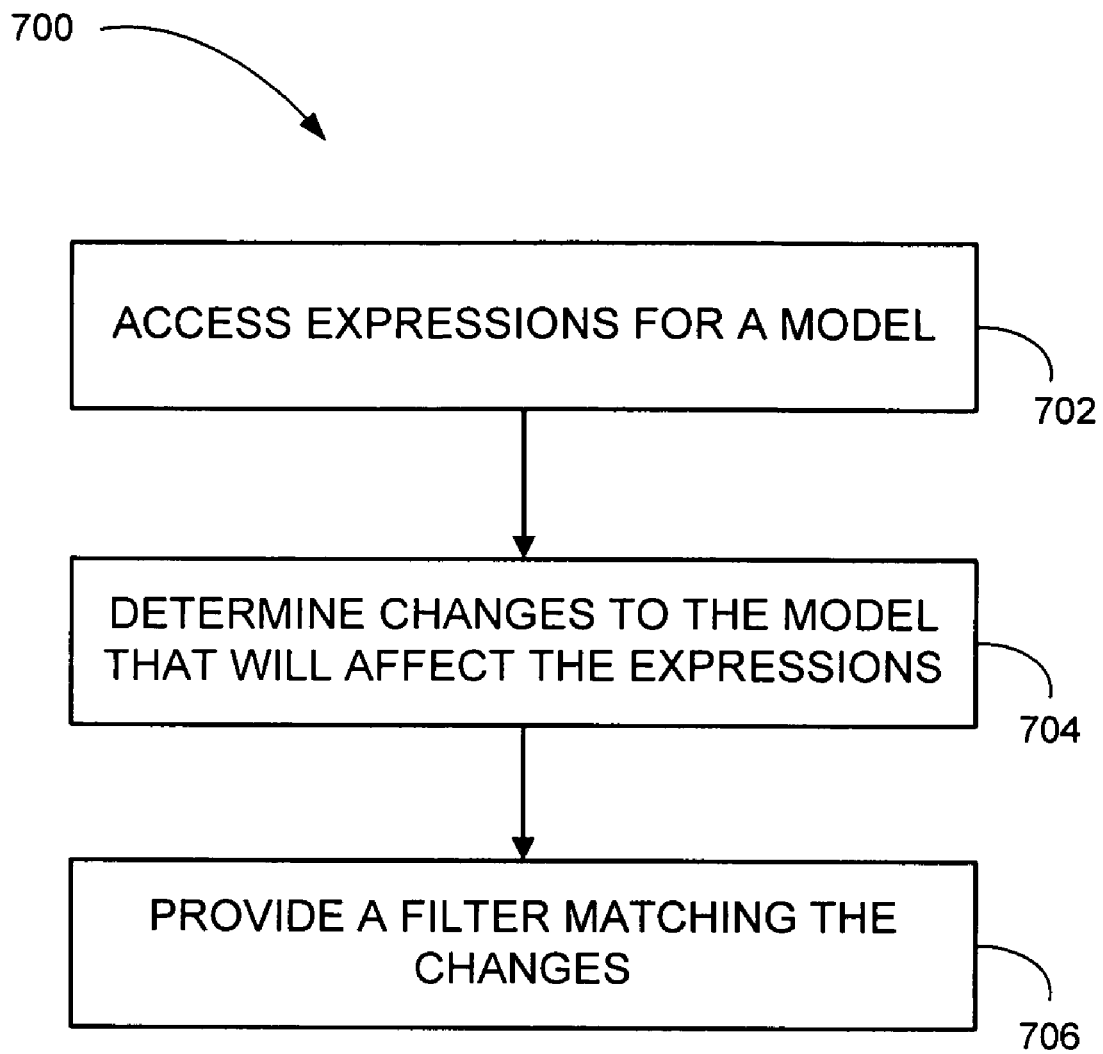
FIG. 7 is a flowchart illustrating a method for registering a model with a filter according to an example embodiment.

Referring to FIG. 7, a method 700 to register a model with a filter is shown in accordance with an example embodiment. In an example embodiment, the method 700 may operate on the impact analyzer 204.

At block 702, the expressions 106 may be accessed for the model 102 (see FIG. 1). For example, the expressions 106 may be received through the impact analyzer 204 (see FIG. 2). For example, the analyze component 302 (see FIG. 3) may be called with the expressions 106.

The method 700 determines at block 704 changes to the model 102 that may have an effect on the expressions 106. For example, the model change events relevant to the expressions 106 may be matched with internal events at the block 704.

In an example embodiment, the internal event may be used to identify event types. The event cache 408 may store information for the event types (e.g., a wage of an employee has changed) and what may be received from the event framework 206 is event instances (e.g., a wage of a particular boss or a particular employee that has changed).

In an example embodiment the internal event may be a description of the event type and in event mapping the internal event may be determined from an event instance. Once an event type is known, information may be accessed in the event cache 408. The event cache 408 may include an expression that relates to wage, such that the expression may be reevaluated when an attribute to the model changes.

At block 706, a filter matching the changes to the model 102 that will have an effect on the expressions 106 may be provided. For example, the filter may be provided from the impact analyzer 204 to the application 202. In an example embodiment, filter expressions may be generated from the matching internal events.

In an example embodiment, at the block 706 the internal events are mapped to event types that are known to the event framework 206 to generate a filter.

In an example embodiment, identified expressions 106 may be parsed into an attribute structure, reverse navigation paths may be generated, and the statement 512 (see FIG. 5), internal events and reverse navigation paths may then be associated.

Upon completion of the block 706, the method 700 may terminate.

Figure 8:
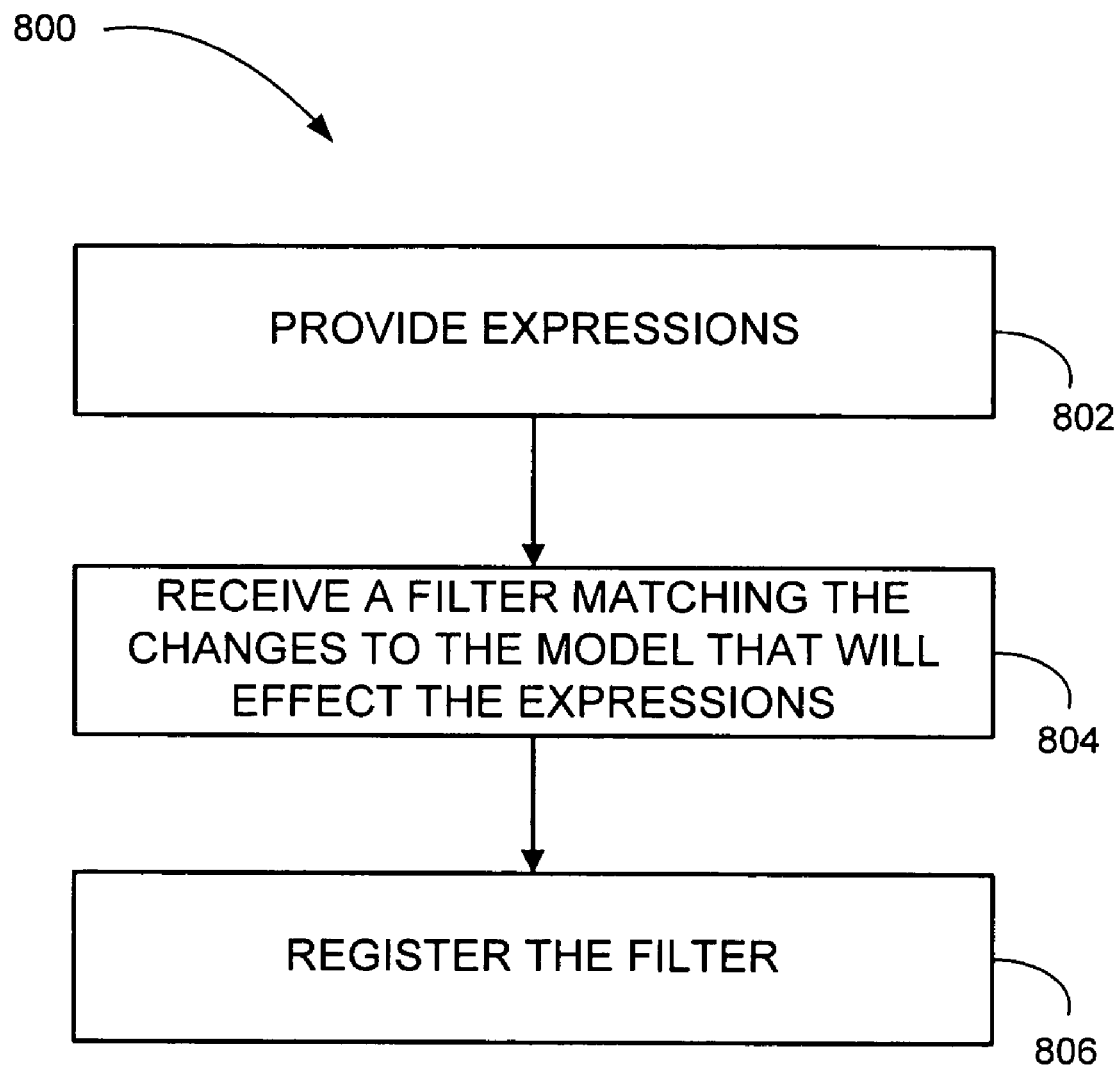
FIG. 8 is a flowchart illustrating a method for registering a model with a filter according to an example embodiment.

Referring to FIG. 8, a method 800 to register a model with a filter is shown in accordance with an example embodiment. In an example embodiment, the method 800 may operate on the application 202.

At block 802, the expressions 106 (see FIG. 1) may be provided, such as from the application 202 to the impact analyzer 204 (see FIG. 2). In an example embodiment, the expressions 106 may be provided from the application 202 to the analyze component 302 (see FIG. 3).

A filter matching changes to the model 102 that will effect the expressions 106 may be received at block 804. In an example embodiment, the filter matching changes may be received by the application 202 from the impact analyzer 204.

At block 806, the filter may be registered. For example, registering the filter may enable the application 202 to subscribe to events received from the event framework 206. Upon completion of the block 806, the method 800 may terminate.

In an example embodiment, the methods 700 and 800 may reduce a number of the expressions 106 to be evaluated for a given modification to the model 102. For example, the use of the methods 700 and 800 may result in a reduction of complexity for enforcing well-formedness rules and in applying only transformations to a source model 102 that actually result in different model elements in a target model 102.

Figure 9:
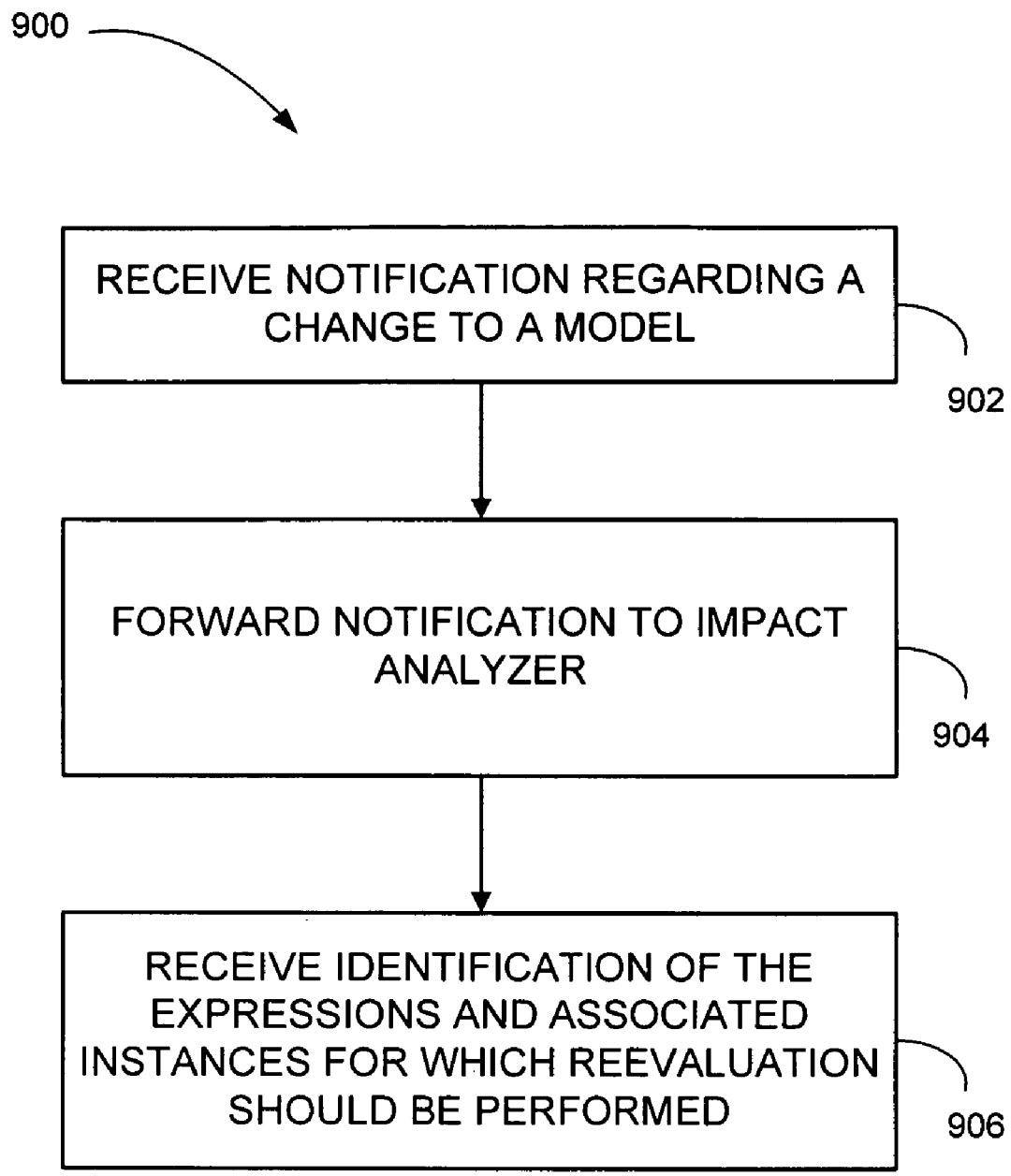
FIG. 9 is a flowchart illustrating a method for responding to a notification according to an example embodiment.

Referring to FIG. 9, a method 900, in accordance with an example embodiment, to respond to a notification is shown. In an example embodiment, the method 900 may operate on the application 202 (see FIG. 2).

At block 902, a notification may be received regarding a change to a particular model 102 (see FIG. 1). For example, the application 202 may receive a change notification identifying events associated with a particular expression 106.

The method 900 may forward the notification at block 904. For example, the notification may be forwarded from the application 202 to the impact analyzer 204.

In response to the forwarded notification, identification may be received regarding the expressions 106 and associated instances for which reevaluation should be performed at block 906. For example, the identification may be received by the application 202 from the impact analyzer 204.

Upon completion of the operations at block 906, the method 900 may terminate.

Figure 10:
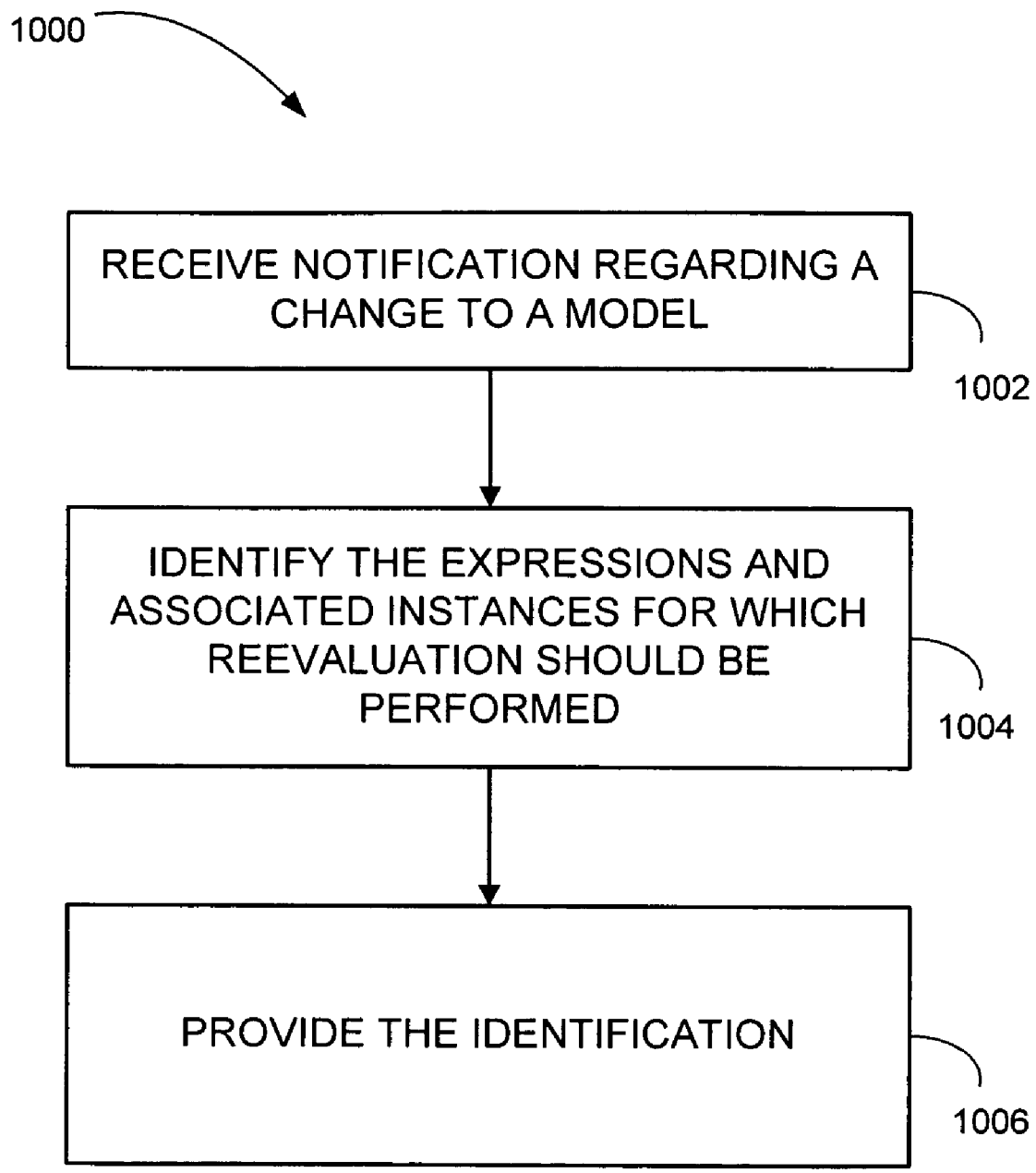
FIG. 10 is a flowchart illustrating a method for responding to a notification according to an example embodiment.

Referring to FIG. 10, a method 1000, in accordance with an example embodiment, to respond to a notification is shown. In an example embodiment, the method 1000 may operate on the impact analyzer 204.

At block 1002, a notification may be received regarding a change to a particular model 102 (see FIG. 1). For example, the change notification may be received by the impact analyzer 204 from the application 202 (see FIG. 2).

The method 1000 may identify the statements 602 and the associated instance sets 604.1-604.n for which reevaluation should be performed at block 1004 (see FIG. 6).

In an example embodiment, an AST with events attached to relevant nodes may be outputted and stored, the events may then be identified in the event cache 408, and the events may be converted into the evaluation units 504 (see FIG. 5).

The method 1000 may provide the identification at block 1006. For example, the identification may be provided from the impact analyzer 204 to the application 202. In an example embodiment, providing the identification may include returning evaluation units 504.

The method 1000 may terminate upon completion of the block 1006.

Figure 11:
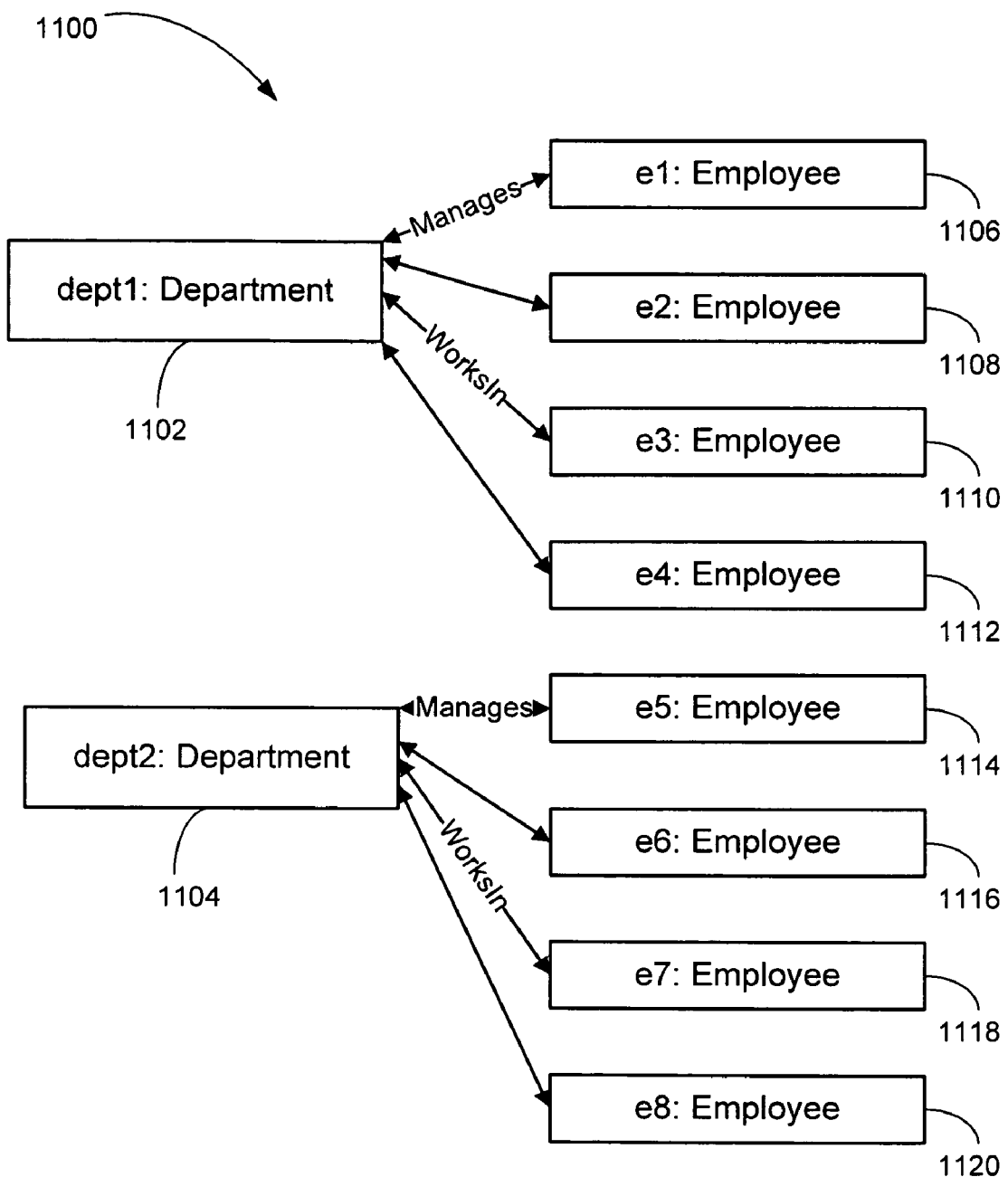
FIG. 11 is a block diagram of an object graph according to an example embodiment.

Referring to FIG. 11, an example object graph 1100 is illustrated. In an example embodiment, the object graph 1100 is an object graph of an example model 102 (see FIG. 1).

The object graph 1100 as shown may include two departments 1102, 1104. The department 1102 may include an employee 1106 that manages the department 1102 and three employees 1108, 1110, 1112 that work in the department 1102. The department 1104 may include an employee 1106 that manages the department 1104 and three employees 1114, 1116, 1118 that work in the department 1104.

Figure 12:
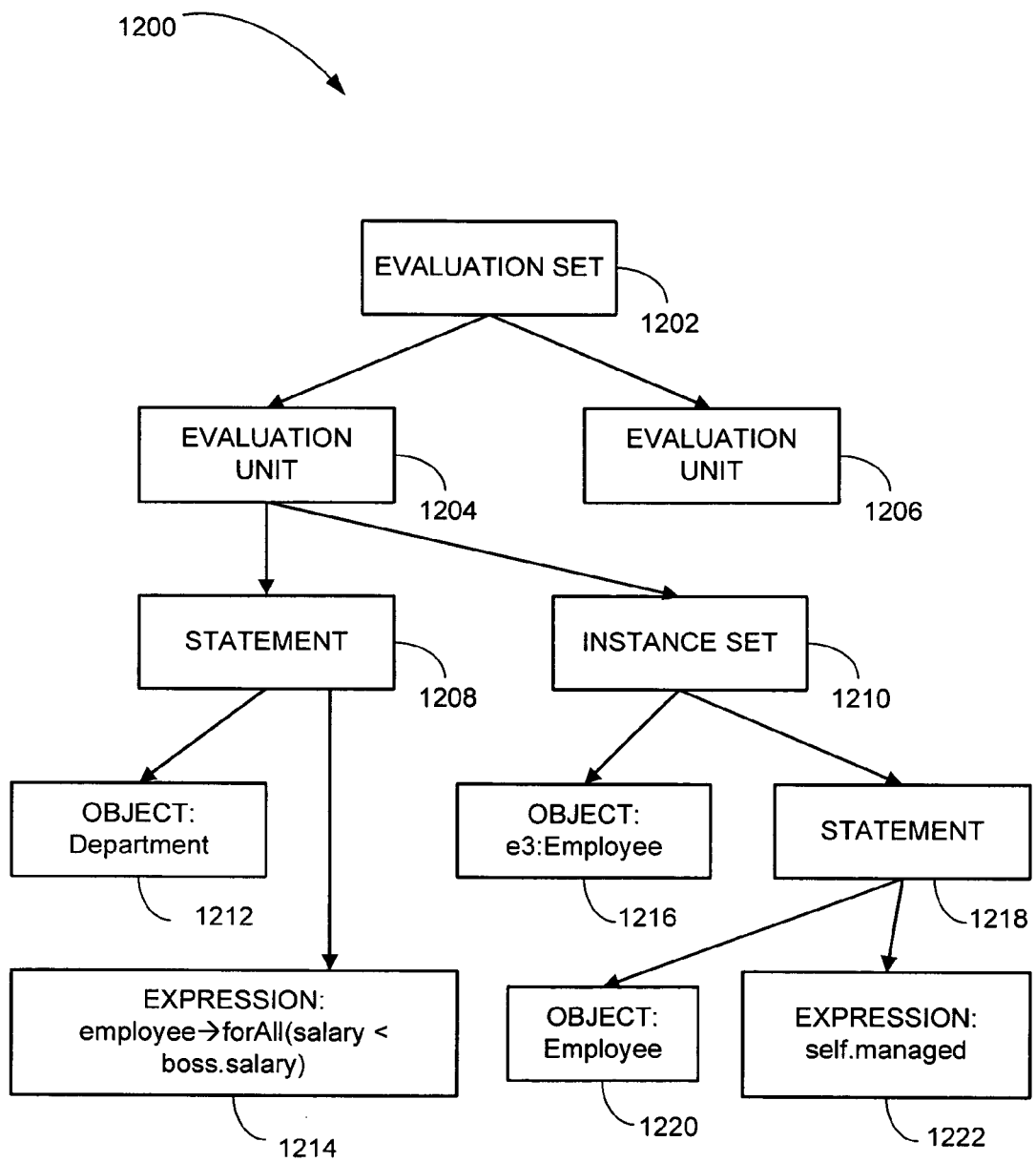
FIG. 12 is a block diagram of a data structure to evaluate an expression according to an example embodiment.

Referring to FIG. 12, an example data structure 1200 to evaluate expression is illustrated. The data structure 1200 may be an example of the data structure 500 (see FIG. 5) given the object graph 1100 (see FIG. 11). The OCL statement:
context Department inv: employee→forAll (salary<boss.salary) may be reflected in the object graph 1200.

In an example embodiment, an evaluation set 1202 may be an example of the evaluation set 502, evaluation units 1204, 1206 may be the evaluation units 504, a statement 1208 my be the statement 512, an instance set 1210 may be the instance set 506, an object 1212 may be the object 508, an expression 1214 may be the expression 514, an object 1216 may be the object 508, a statement 1218 may be the statement 512, an object 1220 may be the object 508, and an expression 1222 may be the expression 514. It may be appreciated that the dependencies of the evaluation unit 1206 are not shown in this example.

As shown, the object 1212 may be "Department" and the expression 1214 may be "employee→forAll (salary<boss.salary)". The object 1216 may be "e3:Employee", the object 1220 may be "Employee", and the expression 1222 may be "self.managed".

Figure 13:
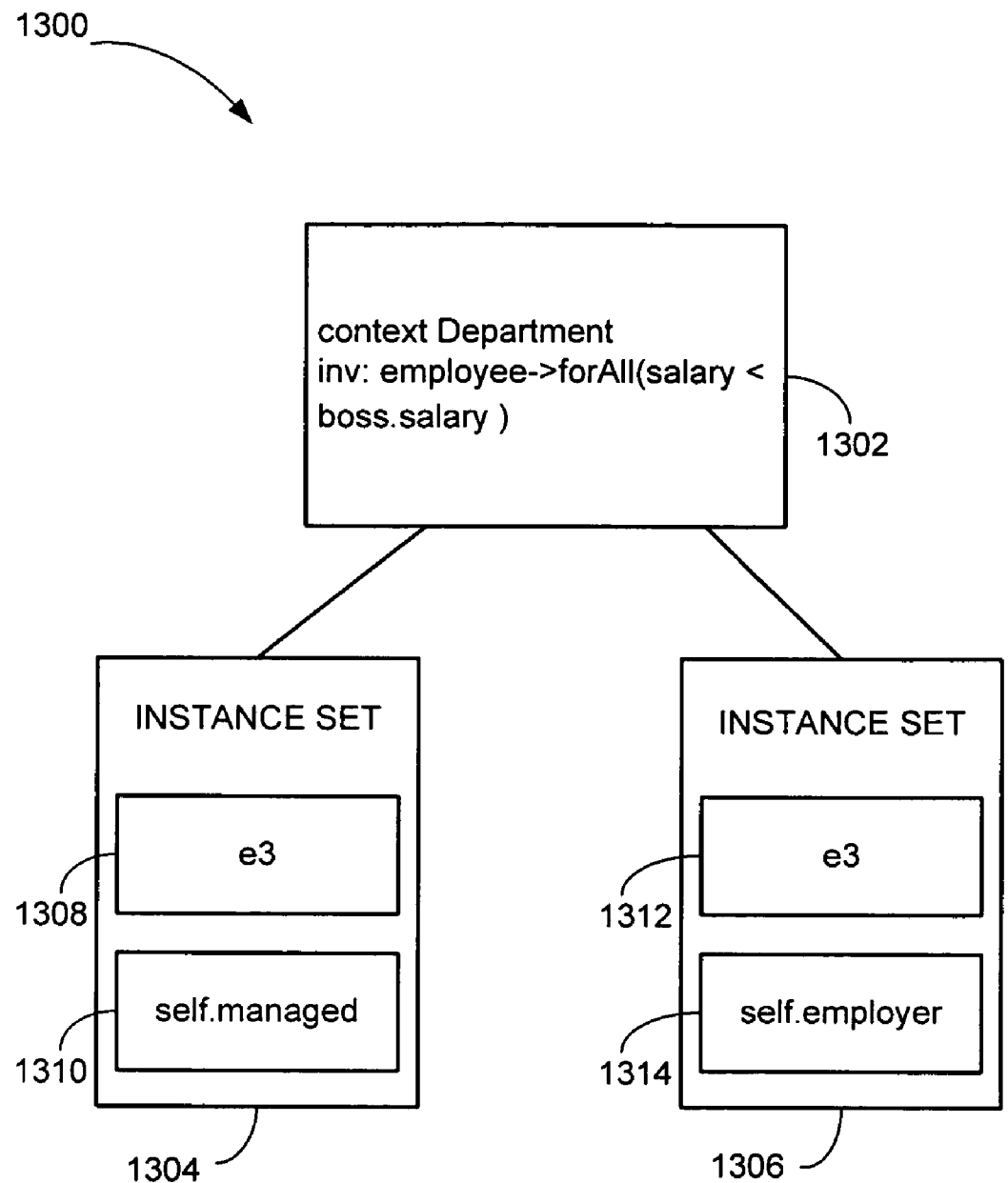
FIG. 13 is a block diagram of a data structure for unit evaluation to an example embodiment.

Referring to FIG. 13, a data structure 1300 for unit evaluation according to an example embodiment is illustrated. The data structure 1300 may be an example of the data structure 600 (see FIG. 6) given the object graph 1100 (see FIG. 11), the OCL statement:
context Department inv: employee→forAll (salary<boss.salary) and a change to a salary of employee 1110.

In an example embodiment, a statement 1302 may be an example of the statement 602, a first instance set 1304 may be an example of the instance set 604.1, a second instance set 1306 may be an example of the instance set 604.2, a starting point 1308 may be an example of the starting point 606.1, a navigation path 1310 may be an example of the navigation path 608.1, a starting point 1312 may be an example of the starting point 606.2, and a navigation path 1314 may be an example of the navigation path 608.2 (see FIG. 6).

As shown, the statement 1302 may include "context Department inv: Employee→forAll(salary<boss.salary)". The first instance 1304 may include the starting point 1308 of "e3" and the navigation path 1310 of "self.managed". The second instance set 1306 may include the starting point 1312 of "e3" and the navigation path 1314 of "self.employer". It may be appreciated that the navigation paths 1310, 1314 may evaluate to "Department dep1".

Figure 14:
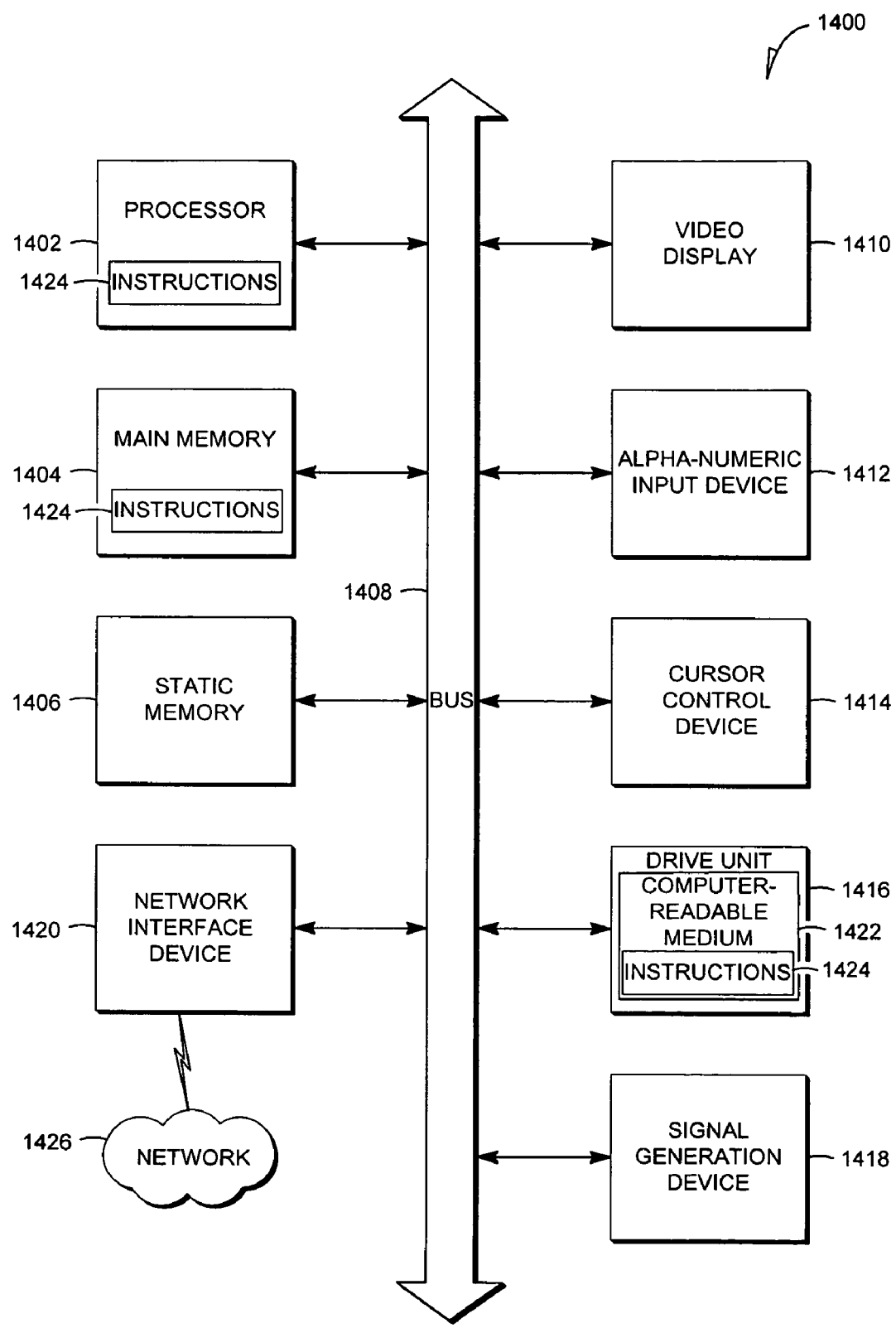
FIG. 14 is a block diagram representation of machine in the example form of a computer system within which instructions, for causing the machine to perform any one or more of the methodologies discussed herein, may be executed.

FIG. 14 shows a diagrammatic representation of machine in the example form of a computer system 1400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU) a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for evaluating constraints associated with a model have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a processor and a memory;
   an application operative deployed within the memory and executed by the processor to use a number of expressions on a model, the model being represented by a modeling language and further defined by the expressions;
   an event framework component to provide notification to the application regarding changes to the model; and
   an impact analyzer component to assess impact of a change to the model by evaluating the expressions, generating an evaluation set based on the evaluating of the expressions, and returning the evaluation set to the application.

2. The system of claim 1, wherein the application is further operative to receive the evaluation set to optimize the change to the model.

3. The system of claim 1, wherein the application includes a constraint checker.

4. The system of claim 1, wherein the application includes a model transformation engine.

5. The system of claim 1, wherein the evaluation set includes an evaluation unit.

6. The system of claim 5, wherein the evaluation unit includes a statement and an instance set.

7. The system of claim 5, wherein the instance set includes a starting point and a navigation path.

8. The system of claim 5, wherein the navigation path is a reverse navigation path.

9. The system of claim 1, comprising:
   a filter component to specify selected notifications to be provided from the event framework component to the application.

10. The system of claim 1, wherein the expressions include constraints for the model.

11. The system of claim 1, wherein the expressions include model-to-model transformation rules.

12. An apparatus comprising:
   a processor and a memory;
   a class scope analysis component deployed within the memory and executed by the processor to receive an expression and provide an identification of an event that is relevant to the expression; and
   an instance scope analysis component to access the identification and to associate a navigation path with the event that is relevant to the expression.

13. The apparatus of claim 12, comprising:
   an event cache component to store the identification of the event and the navigation path associated with the event.

14. The apparatus of claim 12, wherein the navigation path includes a reverse navigation path.

15. The apparatus of claim 12, wherein the navigation path includes a reverse navigation path leading from instances affected by the event to context instances of the expression.

16. An article of manufacture comprising:
   a machine-readable medium having stored thereon a data structure, the data structure including:
   a first field including a statement for a model, the statement identifying in what is to be evaluated for a change to the model; and
   a second field including an instance set for the statement, the instance set including a starting point and a navigation path, and an instance of the model for which the statement is selectively reevaluated for the change to the model.

17. The article of manufacture of claim 16, wherein the navigation path includes a reverse navigation path.

18. A method for evaluating change impact comprising:
   using one or more processors to execute instructions retained in machine-readable media to perform at least some portion of the following
   accessing a proposed change to a model, the model represented by a modeling language and further defined by a number of expressions;
   accessing an expression relevant to the proposed change;
   obtaining an instances set associated with the expression; and
   evaluating the instance set to determine an impact of the proposed change to the model.

19. The method of claim 18, comprising:
   identifying the expression relevant to the proposed change by identifying the expression as an expression for which reevaluation should be performed.

20. The method of claim 18, wherein the instance set includes a starting point and a navigation path.

21. The method of claim 20, wherein the navigation path includes a reverse navigation path.

22. The method of claim 18, wherein the expression includes constraints on the model.

23. The method of claim 18, wherein the expression includes model to model transformation rules.

24. A system comprising:
   a processor and a memory;
   means deployed within the memory and executed by the processor for using a number of expressions on a model, the model represented by a modeling language and further defined by the number of expressions;
   means for providing notification to the application regarding changes to the model; and
   means for assessing an impact of a change to the model by evaluating the expressions, generating an evaluation set based on the evaluating of the expressions, and returning an the evaluation set for use by the first means for using.

25. The system of claim 1, comprising:
   an expression evaluator to receive the evaluation set from the application and to evaluate the evaluation set.

* * * * *